Feb. 16, 1932.  J. A. McGREW  1,845,167
SHOCK ABSORBING MECHANISM
Filed Aug. 17, 1931  3 Sheets-Sheet 1
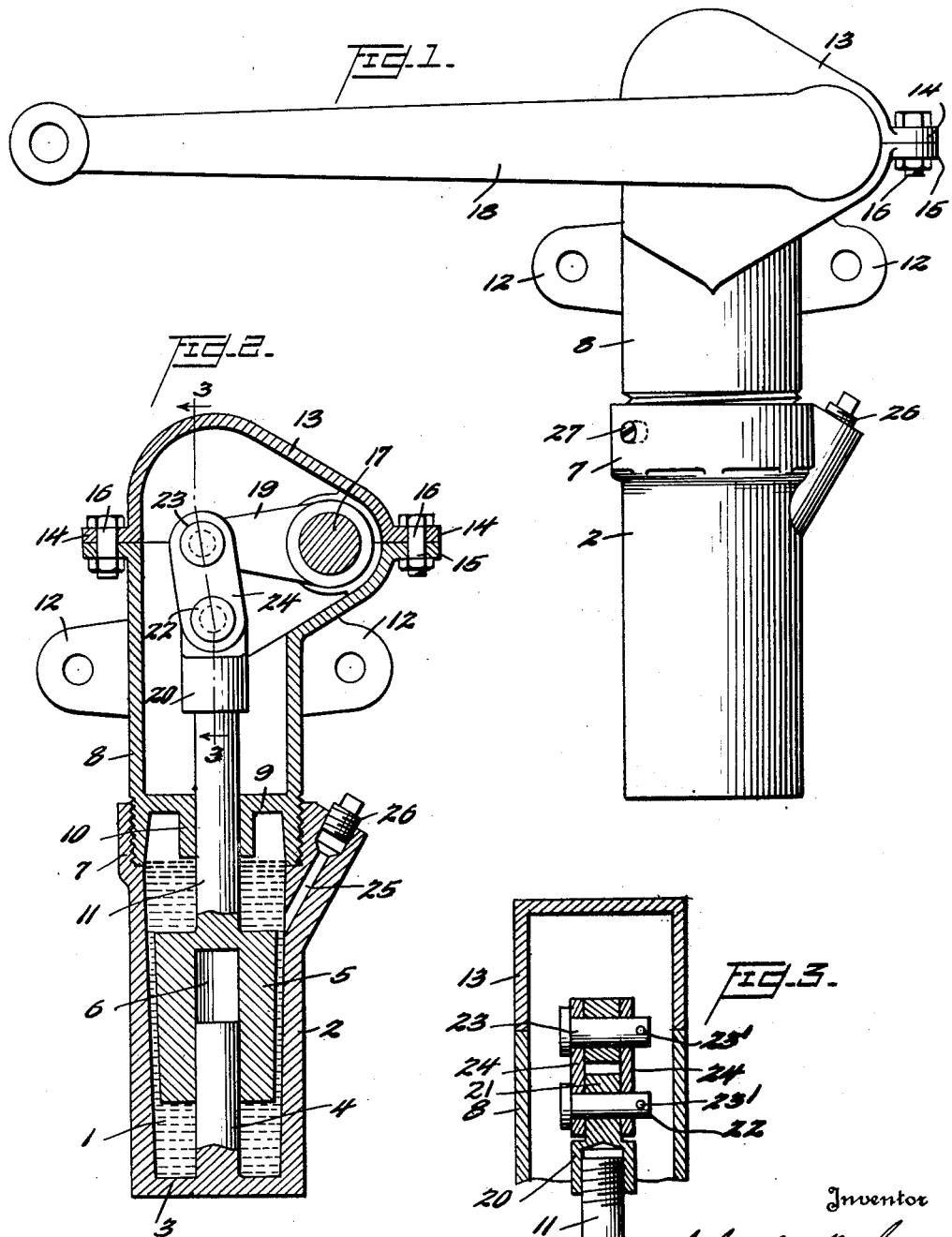

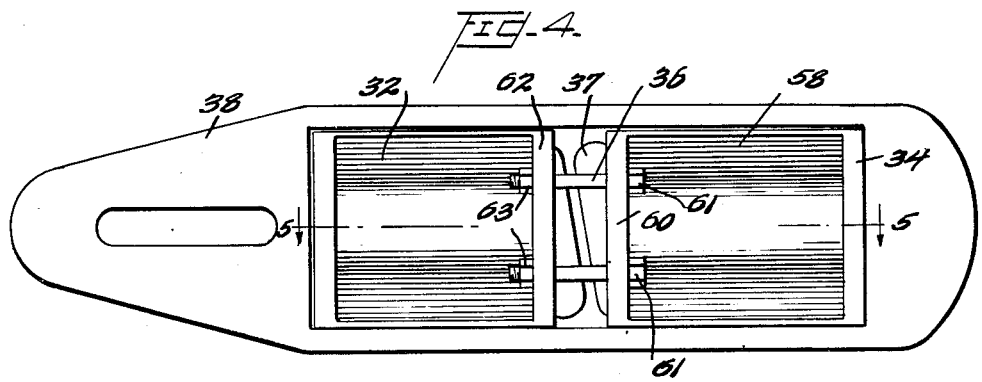
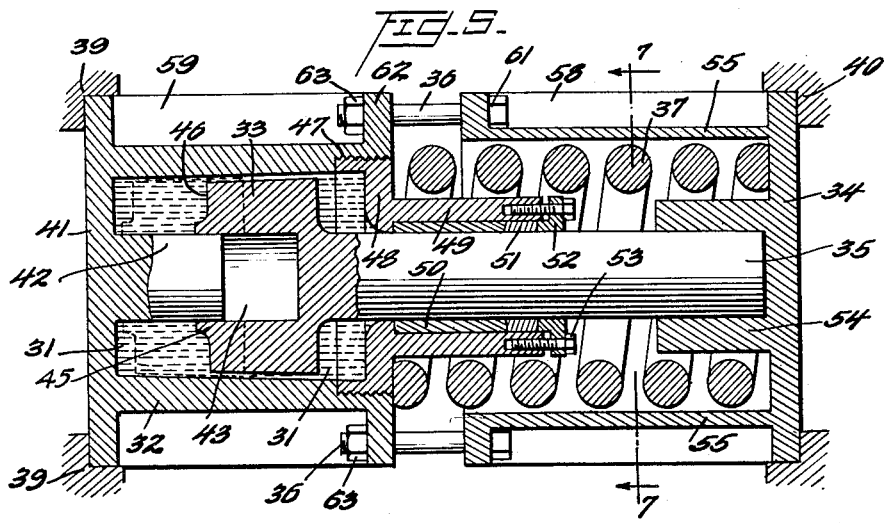

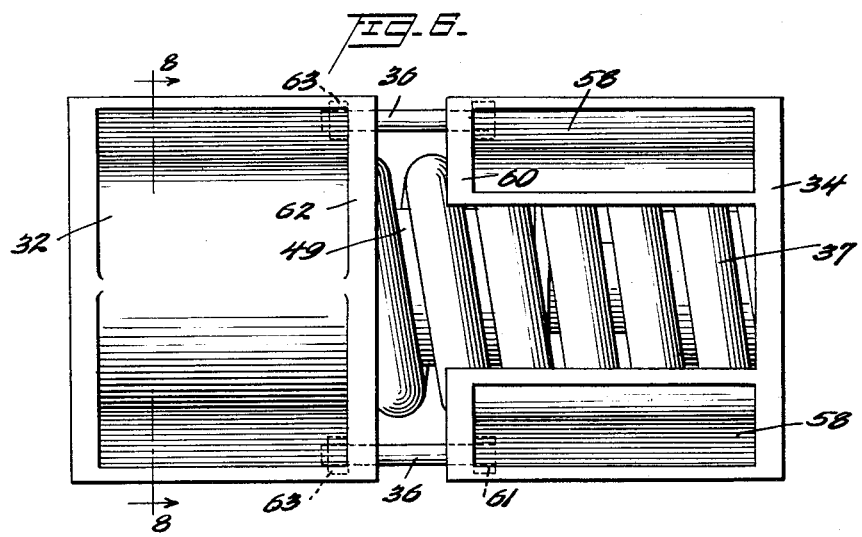
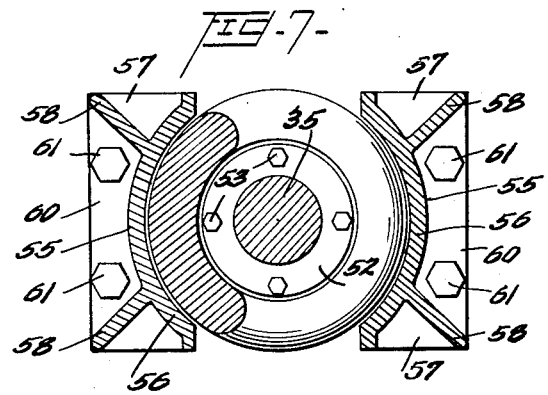
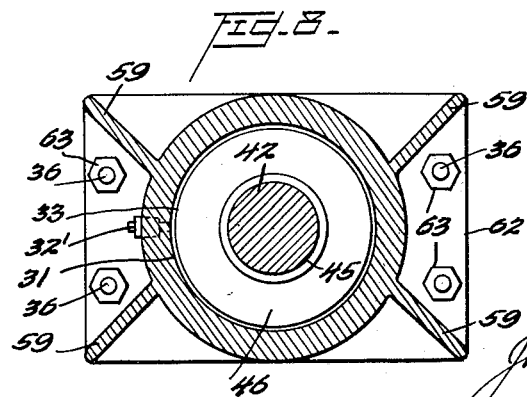

Patented Feb. 16, 1932

1,845,167

UNITED STATES PATENT OFFICE

JOHN A. McGREW, OF ALBANY, NEW YORK

SHOCK ABSORBING MECHANISM

Application filed August 17, 1931. Serial No. 557,678.

This invention relates to improvements in shock absorbing devices of the fluid pressure type, such as, for example, devices that are designed to be used on motor cars and similar vehicles to control the spring rebound when passing over rough or uneven roads, or those of the type commonly termed draft gears, which are adapted to provide means by which the energy of shocks incident to the starting and stopping of railway cars is largely absorbed and dissipated.

The present application is a continuation in part of my copending application Serial No. 276,788, filed May 10, 1928 and Serial No. 290,072, filed July 3, 1928 and renewed June 30, 1931.

The invention, in one of its embodiments, is directed particularly to shock absorbers of the hydraulic type, in which the rebound or reaction of the spring on the vehicle body is minimized by means of a plunger reciprocating in a pressure chamber or cylinder against the resistance of a suitable fluid.

Previous devices of this general type have been found objectionable in practice on account of the more or less intricate and unreliable valve mechanisms employed to regulate the rate of flow of the resistance liquid from one side of the piston to the other, in accordance with the successive movements of the plunger. Prior arrangements of operating parts have also been generally such as to require the use of stuffing boxes to render the casings reasonably liquid tight.

Therefore, one of the objects of the present invention is to provide an improved hydraulic shock absorbing device which is adapted for use in controlling and modifying the effects of excessive rebound of a vehicle spring, with but little interference with the downward or compression movement of the spring. The invention, in this particular application thereof, contemplates a casing or pressure chamber secured to a vehicle member, filled with suitable fluid, and enclosing a plunger attached by appropriate means to a second vehicle member, movable with respect to the first. The relation between the plunger and casing wall is such as to provide an annular passage, the effective area of which varies according to the position of the piston relative to the casing. The annular passage permits a quick and easy displacement of liquid from one side of the piston to the other for normal movements of the piston, but when the vehicle spring is expanded to an unusual degree, the area of the passage decreases directly proportional to the intensity of the reaction causing the rebound of the vehicle body. The arrangement has all the advantages of a finely regulated valve, but is without the necessary inherent weakness of valve mechanisms generally used in similar devices.

In another adaptation of the shock absorbing device forming the subject of the present invention, there is contemplated the provision of an improved hydraulic draft gear for railway rolling stock or the like which is adapted to dissipate and absorb the energy of the heaviest shocks to which it may be subjected without moving through a distance of more than the standard travel of such devices.

Under modern conditions, the travel of a coupler head on a railway car cannot exceed a predetermined amount, usually two and a half inches, the extent of travel for which the standard draft gear is designated.

In view of the limited movement permitted in a standard draft gear, the present and continually increasing weight of cars, high speed classification in freight yards, and further considering the necessity that a draft gear which absorbs very heavy shocks effectively, must also serve to cushion the lighter ones, it is another object of this invention to provide a draft gear which will meet all requirements of the foregoing conditions, but yet of such improved construction and character that the outside dimensions are those of the standard draft gear.

Another object is to provide a draft gear which, while capable of diffusing heavy shocks, at the same time offers a reduced resistance to draft and buffing forces of small magnitude. In other words, it is an object of the invention to provide a device which is quite flexible through certain intermediate limits, but which offers a much higher proportional resistance to the heavier shocks transmitted by the draw-bar.

A further object of this invention is to provide a hydraulic shock absorbing device in which the piston head is made substantially longer than that in the usual form of mechanism, for the purpose of providing an elongated annular conduit between the piston head and the casing wall, which will offer increased resistance to the flow of fluid. In the ordinary device in which a short cylindrical piston is used the resistance is based upon the principles of flow of fluid through an orifice, whereas in the applicant's device, the resistance is based upon the principles governing flow through a conduit. Furthermore, upon movement of the elongated tapered piston within the tapered casing or upon adjustment of the casing relatively to the piston, the elongated annular conduit will be rapidly diminished or increased in capacity, creating a correspondingly rapid increase or decrease in the resistance of the device. The oil or other suitable fluid in passing through this elongated conduit is not only subject to greater friction than if it were passing through an orifice, but it is also believed to be subject to a greater radial compressive stress between the approaching parallel walls of the conduit, than that developed in devices heretofore used. Stated somewhat differently, in the present case substantially the same diminution of volume of the annular conduit occurs as in the case of a cylindrical piston of the same diameter as the forward end of the present one, and slightly more fluid is displaced from one end of the piston to the other during a given forward movement thereof, but these quantities of fluid must pass through a considerably more restricted passageway than in the case of the cylindrical piston, and consequently the resistance to shock afforded by the use of the elongated tapered plunger is greater.

This improved arrangement is furthermore effective in eliminating the necessity for packing glands for preventing leakages on account of the pressure of the fluid in the casing.

Another aim of the invention is to devise a shock absorbing device which is simple in construction, and is made up of individual parts which can be manufactured easily and inexpensively, without the installation of special machinery other than that generally used in approved shop practice.

Other objects and features of novelty will be apparent from the following specification when read in connection with the accompanying drawings, in which certain embodiments of my invention are illustrated by way of example:

Figure 1 is a side elevation of a vehicle shock absorber embodying the principles of my invention;

Figure 2 is a vertical sectional view through the center of Figure 1 on a plane parallel to the operating lever;

Figure 3 is a cross section view taken on line 3—3 of Figure 2, looking in the direction of the arrows;

Figure 4 is a view in side elevation of a draft gear which embodies the principles of my invention, this view showing a standard yoke adapted to be employed in connection with this embodiment;

Figure 5 is a horizontal cross sectional view taken on line 5—5 of Figure 4;

Figure 6 is a plan view of the device with the yoke removed;

Figure 7 is a vertical cross sectional view taken on line 7—7 of Figure 5; and

Figure 8 is a vertical cross sectional view on the line 8—8 of Figure 6.

Referring now more particularly to Figures 1-3 of the drawings in which is illustrated the vehicle spring shock absorber, the pressure chamber 1 is contained within a circular casing 2 closed at the lower end thereof by a chamber head 3, formed integrally with the casing 2. Although in the preferred embodiment of the invention, the pressure chamber head 3 is made integral with the casing, this construction is obviously unnecessary, as such chamber head might well be secured to the casing by means of suitable flanges and bolts. The pressure chamber 1 has a circular cross section on any plane taken parallel with the chamber head 3. From an inspection of Figure 2, it will be observed that the walls of the casing of the pressure chamber, taper slightly from top to bottom so that the diameter of the extreme upper portion of the pressure chamber is somewhat in excess of that of the extreme lower portion of the pressure chamber.

The circular stud 4 is rigidly, integrally or otherwise, formed on the inside of the pressure chamber head 3, thereby projecting into the pressure chamber 1.

Mounted for sliding motion in the pressure chamber is the piston 5. The lower face of the piston is provided with a cylindrical opening 6, which, for all positions of the piston, has a sliding but substantially fluid tight fit with stud 4. The piston 5 has also a circular, horizontal cross section and tapers from the upper to the lower face at an angle similar to that of the walls of the pressure chamber.

The upper end of the casing 2 is enlarged slightly as at 7 to accommodate the lower threaded end of a second casing 8. Near its lower end, casing 8 is provided with a partition 9 which forms the upper head of the pressure chamber. A short boss 10 formed on the partition 9 serves as a bearing and guide for piston rod 11, secured at its lower end to the piston 5. Ears 12 formed on a casing 8 afford means for attaching the body of the device to a vehicle frame in the usual manner. The upper end of casing 8 is closed by means of a cap 13 provided on its lower edges with flanges 14 which cooperate with similar flanges 15 on the upper edge of casing 8. Cap 13 is secured to the casing 8 by means of bolts 16.

The upper edge of the casing 8 and the lower edge of cap 13 cooperate to provide bearings for shaft 17 which has attached to one end thereof the lever 18 which affords means for connecting the movable piston to the vehicle axle in the customary manner.

Midway of its bearings, shaft 17 has integrally formed therewith a short arm 19. A cap 20 is threaded to the upper end of the piston rod 11 and is provided with a projection 21 drilled to accommodate a pin 22. The free end of arm 19 is similarly drilled to receive pin 23. Links 24 are each held in place by pins 22 and 23 and serve as a flexible connection between arm 19 and piston rod 11. Suitable cotters 23' maintain the pins and associated parts in position.

Casing 2 is provided with a small passage 25 for the purpose of filling the pressure chamber 1 with oil or any suitable liquid. Passage 25 is closed by plug 26. The enlarged portion 7 of casing 2 is drilled to receive a short set screw 27.

The operation of the shock absorber will be readily followed. For greatest efficiency, the pressure chamber 1 is filled with liquid up to the level shown in Figure 2, i. e., to the lower end of boss 10. As is the customary practice, the casing 8 is attached to the frame of the vehicle and the lever 18 connected to the axle. In Figure 2 it will be observed that on account of the unfilled upper portion of the pressure chamber, any upward movement of the piston 5 will be practically unopposed. On a compression movement of the spring, the casing 2 moves downwardly and piston 5 moves upwardly on account of its connection with the axle through lever 18. As the annular passage between piston 5 and the walls of the pressure chamber becomes continually enlarged, oil above the piston head will readily pass around the piston into the lower end of the pressure chamber. This, in conjunction with the unoccupied space from the top of the pressure chamber, insures a compression movement of the spring which is practically unretarded by the shock absorber.

On the rebound, the pressure chamber 2 moves upwardly, and piston 5 downwardly. It will be apparent that as piston 5 approaches the chamber head 3, the annular passage between the piston and the walls of the pressure chamber becomes gradually more restricted, thereby offering increased resistance to the downward movement of the piston.

The stud 4, while primarily acting as a centering device and serving to provide a more rigid construction, forms along with the opening 6 in the piston head, a supplementary cushioning means by compressing the small amount of entrapped air within the opening during the downward stroke of the piston.

On account of the threaded connection between casing 8 and casing 2, and the associated set screw 27, casing 2 may be raised or lowered to increase or decrease the cross sectional area of the annular passage between the piston and the casing 2 for any fixed position of the piston. This arrangement affords an adjustment whereby the resistance to the rebound may be increased or decreased within certain limits.

For the reason that there is practically no fluid pressure in chamber 1 during the upward stroke of piston 5, there is very little, if any, tendency for the oil to be forced up through boss 10 around piston rod 11. The unoccupied space between the upper level of the oil and the partition 9 permits sufficient movement of the oil above the piston head for normal movements of the piston to eliminate any leakage from chamber 1 up into the interior of casing 8. It is furthermore quite obvious that any oil which does work its way up past partition 9 will, under normal operation of the device, tend to flow back into the pressure chamber 1.

Referring now to the embodiment of the invention as illustrated in Figures 4–8 inclusive, the draft gear shown therein consists essentially of a pressure chamber 31 provided in a casing 32, a piston 33 slidable in the pressure chamber, with a clearance space between the walls thereof and of said chamber, and a cap or yoke indicated generally at 34 rigidly fixed to the end of the piston rod 35 and movably connected to the pressure chamber casing 32 by bolts 36. A heavy spring 37 is disposed between the pressure chamber casing and the cap.

From an inspection of Figs. 4, 5, 6 and 7 it will be seen that the exterior over-all dimensions are such that the draft gear is substantially a rectangular block fitting within a yoke 38 of standard size, and between the usual stop plates 39 and 40 which are attached to the car body in the usual manner. It will be understood, of course, that the yoke 38 and the stops 39 and 40 are but diagrammatically represented inasmuch as these elements are portions of standard railway equipment, and their functions and positions relative to the car body are well known in the art.

Referring again to the preferred form of the invention illustrated in Fig. 5, the pressure chamber, on a section taken at right angles to the piston rod, is circular, but as is apparent from the drawings, the chamber tapers along its axis toward the left, so that the area of one chamber head is somewhat less than the other.

The pressure chamber head 41 is an integral part of the casting forming the side walls of the pressure chamber, and has attached thereto, integrally or otherwise, a stud 42 which extends into the pressure chamber. Stud 42 is of such length that at all times it projects into a cylindrical opening 43 formed in the working face of piston 33. The stud and the opening in the piston are accurately machined so as to effect a slidable but substantially fluid-tight fit between the stud and the piston. In some instances, however, it may be desirable to provide a certain amount of clearance between stud 42 and the walls of the opening 43 in the piston head. The stud 42 should preferably have the same cross sectional area as piston rod 35.

The circular projection 45 extending outwardly from the working face 46 of the piston is provided to allow a greater contact surface between the piston head 33 and the inwardly extending stud 42. The advantage of this feature is particularly apparent from Fig. 5 where the piston head 33 is shown in full lines in its normal position of rest, that is, where spring 37 is expanded to the extreme limit of its travel.

The piston head 33 is circular in cross section, and has the general shape of a frustum of a cone. At its extreme right hand position, that is, its position of rest, piston 33 is so spaced from the walls of the pressure chamber so as to form an annular passage and to permit oil or other suitable fluid to pass from one side of the piston to the other as the piston moves back and forth through the chamber. The piston head, however, is so proportioned with respect to the walls of the pressure chamber that the annular space between the piston and the walls of the pressure chamber is never quite closed, even when the piston is in the extreme position to the left as indicated by the dotted lines. When, however, the piston has been moved to the left so that ring 45 almost contacts with chamber head 41, it will be apparent that the annular passage between the piston and the chamber walls has become so constricted, that only an extremely small quantity of oil or other fluid can pass from one side of the piston to the other. Thus, it will be seen that for short movements, the cushioning effect of the oil is quite moderate, but beyond a certain point, the resistance offered rapidly rises to a maximum.

The casing 32 is bored and internally threaded at 47 to receive the pressure chamber head 48 which carries the outwardly extending sleeve 49. The sleeve 49 receives the bushing 50, which in turn serves as a bearing for piston rod 35. In case a bushing is used, it will usually be necessary to provide a packing ring 51 screwed in place by the usual collar 52 and bolts 53.

Sleeve 54 of cap 34 is preferably shrunk onto the end of piston rod 35, although obviously other methods of attaching the cap to the piston rod may be employed.

Formed on either side of the cap 34 are the longitudinal arms 55 which extend toward the pressure chamber casing. The arms are illustrated in section in Figure 7 from which it will be seen that each arm is provided with an inwardly opening semi-circular portion 56. V-shaped cut-outs 57 conserve material and decrease weight, while the diagonally disposed longitudinal flanges 58 are included for strengthening purposes. It will be seen from Fig. 8 that similar diagonal members 59 are provided on the pressure chamber casting for the same reasons.

The ends of arms 55 are formed with right angular flanges 60 which afford bearing seats for the heads 61 of bolts 36, which pass through flanges 60 and into similar flanges 62 formed on the pressure chamber casting. Bolts 36 are provided on their ends with suitable lock nuts 63.

As apparent from the drawings, spring 37 is guided on sleeves 49 and 54 and bears against the pressure chamber casing and cap 34. From the arrangement of the bolts 36, relative to the cap and the pressure chamber casing, and the spring, it will be seen that the latter tends to urge the cap 34 continually toward the right, but that motion in that direction is limited by the effective length of bolts 36. Therefore, spring 37 has a constant tendency to return the piston 33 to its position of rest.

The pressure chamber 32 may be filled with a suitable liquid by removing plug 32'.

The operation of the draft gear illustrated in Fig. 5 is as follows: Assuming that a sudden pull or jerk has been applied to yoke 38 by a draw-bar not shown, that is, a force such that will tend to move yoke 38 toward the left, this energy will be transmitted by the yoke to cap 34. As the pressure chamber casing is prevented from any movement toward the left by stop plates 39 attached to the frame of the car, it will be seen that piston rod 35 and piston 33 will be moved toward the left against the resistance of the fluid in front of the working face 46, and against the compression of spring 37. On account of the cone shaped interior of the pressure chamber, and the corresponding conformation of the piston, it will be apparent that during the initial movement of piston 33 toward the left, comparatively little fluid resistance will be afforded, for the reason that the oil will pass easily through the annular space between the piston and pressure chamber walls to the opposite sides of the piston. However, as the piston approaches the chamber head 41, the elongated annular space between the piston and the pressure chamber walls continually becomes smaller so as to offer increasing resistance to the passage of fluid from one side of the piston to the other. When the pull on the yoke 38 becomes constant, the liquid in the pressure chamber will adjust itself to the new position of the piston and the steady pull on the draw-bar will be transmitted through yoke 38, cap 34, spring 37, pressure chamber casing 32, and stops 39 to the car body. It should be understood, of course, that this constant pull referred to is less than the capacity of spring 37.

Now assuming that the yoke 38 has been subjected to a sudden jolt in the opposite direction, that is, so that the yoke moves toward the right in Fig. 4, this force will be transmitted by the yoke directly to the exterior of pressure chamber head 41. On account of stops 40 it is apparent that cap 34 is immovable toward the right. Therefore, the pressure chamber casing 32 will be moved toward the right against the compression of spring 37 and the fluid resistance on the piston head within the pressure chamber. During the movement of casing 32 toward the right, the resistance offered by the oil in front of working face 46 is the same as though the piston 33 itself were moving toward the left, and the casing being stationary relative thereto. If the thrust on the yoke toward the right should become constant, and less than the capacity of spring 37, the force will be transmitted through yoke 38, pressure chamber casing 32, spring 37, and cap 34 and through stop plates 40 to the car body.

From the foregoing, it will be seen that for relatively small movements between the piston and the pressure chamber casing, comparatively little resistance is offered against movement of the piston inasmuch as the oil has a somewhat free passage from the working face of the piston to the opposite side. However, if the travel between the piston and the pressure chamber casing increases in intensity, the resistance rapidly builds up to a maximum amount.

It will be understood that various changes and modifications may be made in the embodiments illustrated and described without departing from the scope of the invention as defined in the following claims.

Having thus described the invention, what is claimed as new and desired to be secured by Letters Patent is:

1. The combination with two spaced members which are relatively movable toward and away from each other, of means for yieldably opposing relative movement of said members in one direction to cushion shocks incident to the movement of said members, said means including a casing, a pressure chamber in said casing adapted to contain a fluid, a piston movable in said pressure chamber, a rod on said piston, said casing and said rod adapted to be connected respectively to said relatively movable members, the pressure chamber and the piston having such similar conformation relative to each other as to cause increasing resistance to the passage of fluid from one side of the piston to the other on relative movement in one direction between the piston and pressure chamber casing, and a stud rigidly secured to the casing cooperating with an opening in the adjacent face of the piston to provide an auxiliary pressure chamber.

2. The combination with two spaced members which are relatively movable toward and away from each other, of means for yieldably opposing relative movement of said members in one direction to cushion shocks incident to the movement of said members, said means including a casing, a pressure chamber formed substantially as the frustum of a cone in said casing and adapted to contain a fluid, a similarly shaped piston movable in said pressure chamber, a piston rod projecting through one head of the pressure chamber, said casing and said rod adapted to be associated respectively with said relatively movable members, a stud rigidly secured to the opposite head of the pressure chamber of sufficient length as to continually slidably engage an opening in the piston head, the piston rod and the stud having substantially the same cross section.

3. The combination with two spaced members which are relatively movable toward and away from each other, of means for yieldably opposing relative movement of said members in one direction to cushion shocks incident to the movement of said members, said means including a casing adapted to be associated with one of said members, a pressure chamber formed substantially as the frustum of a cone in said casing and adapted to contain a fluid, a similarly shaped piston movable in said pressure chamber, and a piston rod projecting through one head of the pressure chamber and adapted to be associated with the other of said members.

4. The combination with two spaced members which are relatively movable toward and away from each other, of means for yieldably opposing relative movement of said members in one direction to cushion shocks incident to the movement of said members, said means including a casing adapted to be associated with one of said members and having a tapered fluid chamber therein, an elongated tapered piston movable in said casing and adapted to be associated with the other of said members, the piston being of such size that in all of its operative positions a passageway will remain between the piston and the casing, which is the only means of by-passing the fluid, the relation between the piston and casing being such that the effective area of said passageway will vary as the piston moves longitudinally in the chamber.

5. The combination with two spaced members which are relatively movable toward and away from each other, of means for yieldably opposing relative movement of said members in one direction to cushion shocks incident to the movement of said members, said means including a casing adapted to be associated with one of said members, a tapered fluid chamber therein, a correspondingly tapered piston within the chamber and spaced from the walls thereof, whereby an annular by-pass conduit is formed, the longitudinal cross-section of which is in the form of two similar parallelograms, said piston movable in said chamber, whereby the capacity of said annular conduit is varied, said piston being associated with the other of said members.

6. The combination with two spaced members which are relatively movable toward and away from each other, of means for yieldably opposing relative movement of said members in one direction to cushion shocks incident to the movement of said members, said means including a casing adapted to be associated with one of said members, a tapered fluid chamber therein, a correspondingly tapered elongated piston movable therein and spaced from the walls of the chamber, whereby an annular by-pass passage is formed which for any given position of the piston has uniform width throughout its length, and whereby movement of the piston in one direction longitudinally of the chamber exerts a radial compressive stress upon the fluid within said conduit, said piston being associated with the other of said members.

7. The combination with two spaced elements which are relatively movable toward and away from each other, of means for yieldably opposing relative movement of said elements in one direction to cushion shocks incident to the movement of said elements, said means including a fluid chamber and an elongated plunger therein, said chamber and plunger being, respectively, adapted to be connected to relatively movable elements, the side walls of the chamber and plunger being tapered to substantially the same degree and in the same direction, a member rigid with the chamber wall which extends axially of the chamber and toward the plunger, which member is slidably received within a mating recess formed axially in the plunger, so that the plunger is constrained to move axially of the chamber upon the occurrence of relative movement between said movable elements, there being for all positions of the plunger an elongated fluid passage between the side wall of the chamber and the side wall of the plunger, which has, in cross section, the shape of an annulus.

In testimony whereof I hereunto affix my signature.

JOHN A. McGREW.